US006283194B1

(12) United States Patent
Detering et al.

(10) Patent No.: US 6,283,194 B1
(45) Date of Patent: Sep. 4, 2001

(54) PROCESS FOR PRODUCING STRUCTURAL ELEMENTS

(75) Inventors: Jörg Stefan Detering; Christian Grunewald, both of Bocholt (DE)

(73) Assignee: Grunewald GmbH & Co. KG, Bocholt (DE)

( * ) Notice: Subject to any disclaimer, the term of this patent is extended or adjusted under 35 U.S.C. 154(b) by 0 days.

(21) Appl. No.: 09/228,988

(22) Filed: Jan. 12, 1999

(30) Foreign Application Priority Data

Jan. 13, 1998 (DE) ............................................. 198 00 863

(51) Int. Cl.[7] ............................ B22C 9/02; B22C 21/14; B29C 13/00

(52) U.S. Cl. .............................. 164/35; 164/411; 164/15; 264/279.1; 264/274

(58) Field of Search ................................. 164/15, 39, 37, 164/34, 35, 411, 6, 409; 264/86, 516, 250, 255, 256, 225, 279.1, 274

(56) References Cited

U.S. PATENT DOCUMENTS 2,474,186 * 6/1949 Marks .
2,688,781 * 9/1954 Fahlberg et al. .
4,812,278 * 3/1989 Natori et al. .
4,990,292 * 2/1991 Hattori et al. .
5,469,908 11/1995 Chmel et al. .

FOREIGN PATENT DOCUMENTS 3127313 4/1987 (DE) .
19545167 6/1997 (DE) .
406277794 * 6/1999 (JP) .

* cited by examiner

*Primary Examiner*—Tom Dunn
*Assistant Examiner*—Len Tran
(74) *Attorney, Agent, or Firm*—Collard & Roe, P.C.

(57) ABSTRACT

A process for producing structural elements, preferably prototypes, in which a "lost" model, i.e., positive model, of the structural element is produced in a first step and the model is subsequently cast with a molding compound to produce a negative mold. The mold is then used for manufacturing the structural element, preferably a prototype, by casting. The model is cast and/or filled with the molding compound in a plurality of successive steps and the position of the model relative to a reference plane is changed in each of the individual steps of casting or filling.

10 Claims, 4 Drawing Sheets

PROCESS FOR PRODUCING STRUCTURAL ELEMENTS

BACKGROUND OF THE INVENTION

1. Field of the Invention

The present invention relates to a process for producing structural elements, preferably prototypes, in which a "lost" model, i.e., a positive model, of the structural element is produced in a first step, the model is subsequently cast with a molding compound for producing a mold, i.e., a negative model, and the mold then produces the structural element, preferably a prototype, by casting.

2. The Prior Art

Processes of this type, which are preferably employed for producing costly prototypes containing, for example complex cavities, are known from the state of the art. The plaster casting process, in which the molding compound is a gypsum compound, is such a process. In some applications, the so-called "fine casting process" is employed for producing such prototypes instead of using the plaster casting method. The drawback common to these two processes is that they are either not suitable at all for producing prototypes with complex shapes and/or complex cavities, or that they are very expensive.

A process for producing structural elements such as prototypes has become known from German Patent No. DE 195 45 167 A1. This process uses a polystyrene model, which is coated with wax by immersing it in liquid wax. A ceramic sludge is then applied to the surface of the wax. The model is then calcinated and the cavity formed by gassing out the polystyrene is filled by pouring in the molding compound using the fine casting process. In order to permit the manufacture of more complex structural elements by this method, several pieces of the structural elements are first produced in this process, which then have to be assembled into a complete structural element following their immersion in wax. This process is relatively complicated and thus costly, because several components of the structural element have to produced separately.

SUMMARY OF THE INVENTION

It is therefore an object of the invention is to provide a process for producing structural elements, in particular prototypes of the type specified above, that permits the structural element to be manufactured with less technical expenditure and at a consistent rate, as well as less expensively.

These and other objects of the invention are accomplished by process for producing structural elements comprising producing a positive model of the structural element in a first step, casting the positive model with a molding compound to produce a negative mold, and manufacturing the structural element by casting the mold.

The model is cast with the molding compound in a number of successive steps, and the arrangement or position of the model is changed relative to a reference plane in each of the individual steps of casting or filling.

The main problem afflicting the prior methods is that reproduction of complex cavities with molding compound is not possible, because air cannot completely escape from these cavities when they are filled with the molding compound. The present invention overcomes this problem in the following manner: In a first part step of the process, the model is first cast with the molding compound and the cavities are filled to the extent possible with the molding compound while the model is in a first arrangement or position relative to the reference plane. In this first step, lateral openings of the model, if any, are closed so that the molding compound cannot exit through these openings. The molding compound is subsequently poured in through openings from the top. The position of the model relative to the reference plane is then changed, for example, turned by 90° about one of its axes. Molding compound is then again filled in through a top opening of the model, and lateral openings of the model, if any, are closed. Since the position of the model was changed, air now can escape from parts of the cavity from which no escape was possible in the previous arrangement of the model. Thereafter, in another step of the process, the position of the model relative to the reference plane is changed again, if need be, and any lateral openings are closed. Molding compound is then filled in again through an opening now disposed at the top.

If, for example, the model is turned by 90° after each of these steps, and all three spatial axes are taken into account, all cavities of the model can be filled with molding compound. A maximum of six different arrangements of the model and, correspondingly, six steps, depending on the structure of the model and the complexity of the cavities are needed to file the model. The model can therefore be completely reproduced.

Even though the process for casting the model with the molding compounds is divided into individual steps, the process as defined by the invention offers the advantage that the model does not have to be divided, and the process can always be carried out with a single-piece model. The process as defined by the invention, furthermore, can be carried out smoothly at a relatively consistent rate.

When certain molding compounds are employed with the process according to the invention, i.e., materials such as plaster which set and cure relatively quickly, it may be advantageous if connecting elements with a suitable geometry are employed. These elements are jointly cast in the molding compound in the respective step of the process. After the molding compound poured in one step has set and cured at the start of the next-following step, bonding of the fresh molding compound to the molding compound already set is enhanced by the connecting elements. Connecting elements with undercut surfaces are preferably employed, so that a positive joint of the individual surfaces of the molding compound is obtained after curing is completed. For example, simple available metal elements such as screws or the like can be used as connecting elements, and do not add additional significant cost to the process.

If the model contains defined cavities, for example relatively long channels which are filled with the molding compound, a reinforcement is preferably incorporated in the regions of the molding compound filling the channels in order to prevent cured parts of the molding compound, e.g., longer arms of filling channels, from breaking off or becoming damaged after the model has been removed. Suitable elements such as wires or other metal parts consisting of flat steel, round steel or the like can be employed for such reinforcement.

It is most preferable that in each step of casting of the model with the molding compound, the model is set up in as favorable a spatial position as possible, so that the fewest individual steps of the casting process is needed depending on the complexity of the cavities present.

Additional advantages of the invention are shown by the following detailed description.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENTS

Figure 1:
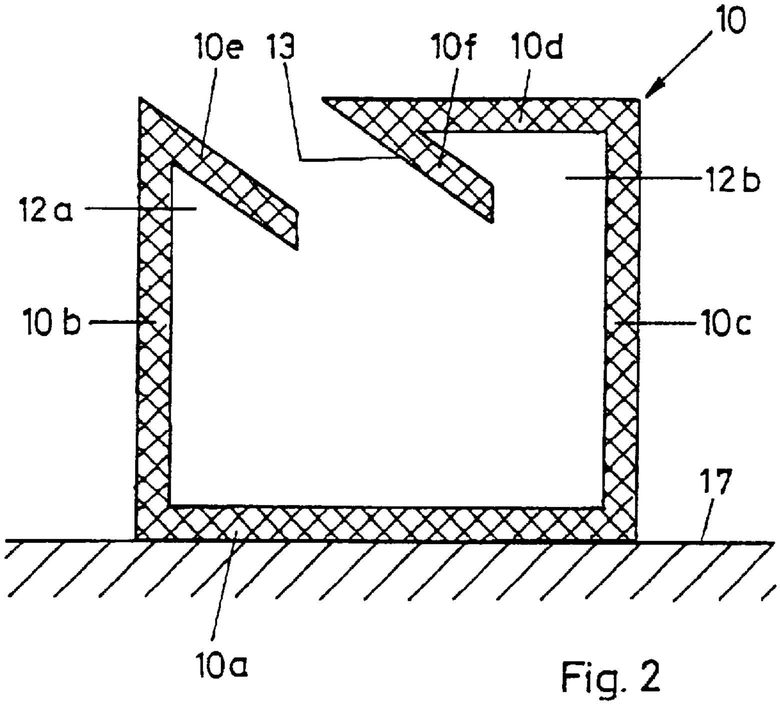
FIG. 1 is a schematically simplified sectional drawing of a model, which is filled with a plaster compound according to the process defined by the invention.

Reference is made first to FIG. 1. This representation shows a model 10 for producing a prototype consisting of sintered polystyrene. In the representation according to FIG. 1, model 10 is shown in a schematically highly simplified way in order to explain the process. The cavity of model 10 is filled with a molding compound, such as a plaster compound 11. When the process as defined by the invention is employed in practical life, the models are generally substantially more complex with respect to their outer shape and their cavities. However, the process as defined by the invention is carried out in the same way as explained below.

Model 10 according to FIG. 1 consists of a bottom 10*a*, a vertical side wall 10*b* adjoining bottom 10*a* on the left, and a vertical side wall 10*c* adjoining bottom 10*a* on the right. Model 10 has a top wall 10*d*, which extends only partially over the width of the model and parallel to bottom 10*a*. Starting from the left side wall 10*b*, a partial wall 10*e* extends from the top end at an acute angle inwardly in the direction of the cavity and inclined downwardly. A molded-on, inclined partial wall 10*f* extends from the upper wall 10*d* from the inner end of upper wall 10*d* at an acute angle downwardly and in the direction of the right-hand side wall 10*c*.

If a model 10 according to FIG. 1 were filled with plaster compound 11 from the top through the top opening 13, residual air would collect or be trapped in cavity 12*a* on the left, and the cavity 12*b* on the right, and could not completely escape. This means that the cavity cannot be completely filled with plaster compound 11 from the top through opening 13.

Figure 2:
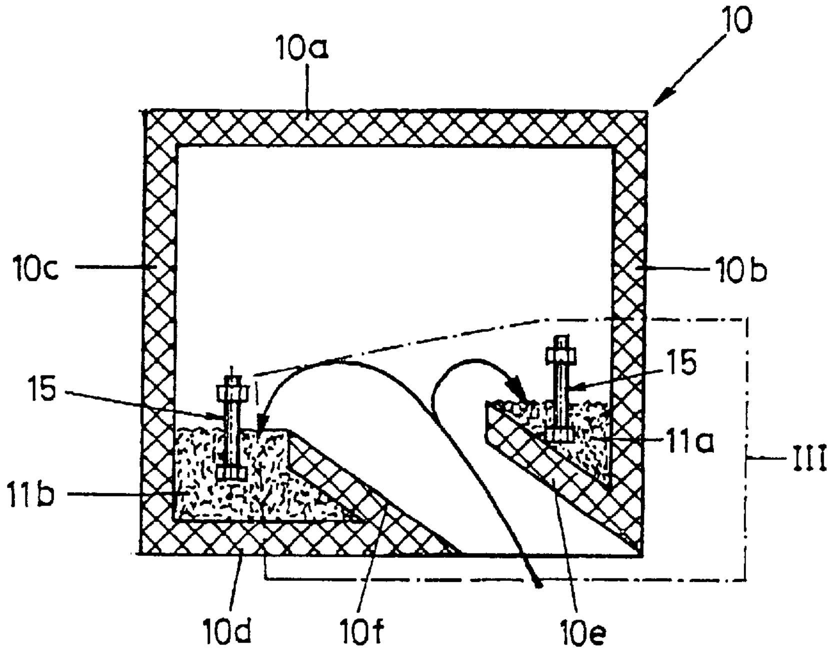
FIG. 2 is a correspondingly schematically simplified representation of the model of FIG. 1 shown, however, in an arrangement turned clockwise by 90°.

To fill the cavities of model 10 with plaster compound 11, model 10 is turned by 180° in the plane of the drawing, i.e., it is turned upside down to a position as shown in FIG. 2. It is now possible to first fill the cavity in the interior of model 10 with plaster compound 11, in such a way that the plaster compound 11*a*, 11*b* is first filled in via a hose or a similar feed line through the then-downwardly open opening 13. The plaster compound 11*a*, 11*b* is only filled up to a level such that the cavities 12*a* and 12*b* are filled, but each only up to the top edge of the two inclined partial walls 10*e* and 10*f*. Plaster compound 11*a*, 11*b* thus cannot exit again downwardly from the two cavities 12*a*, 12*b* via opening 13. The main part of the hollow space or cavity disposed further up is not yet filled with plaster compound 11, but filled only thereafter in a second process step.

It is possible that plaster compound 11*a*, 11*b* will set and cure relatively quickly after the first process step. It may then be difficult to tie or bond the plaster compound 11 to be filled in the second process step to the boundary surface of the "old" or cured plaster compound. For this reason, connecting elements 15 are used, which are embedded in the soft plaster compound in the first pouring step, so that these elements project beyond the boundary surface into the cavity as shown in FIG. 2. In the next step, fresh plaster compound 11 can then be filled into the remaining hollow space of model 10 to obtain a positive connection with the connecting element 15, so that the fresh plaster compound 11 is bonded well to the cured plaster compound 11*a*, 11*b*, as shown in FIG. 3.

Figure 3:
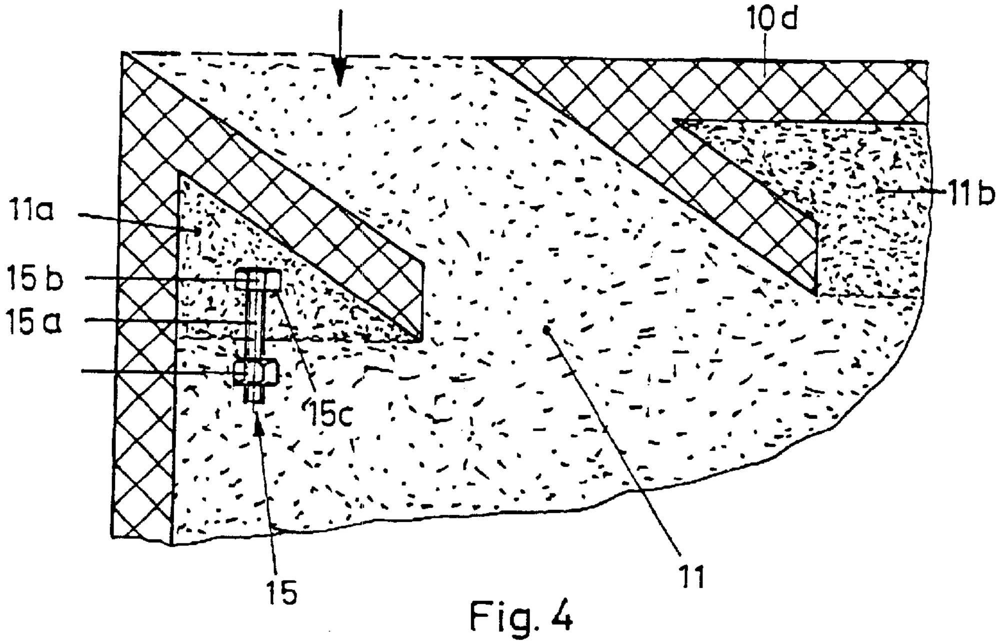
FIG. 3 is an enlarged detail view of a cutout III from FIG. 2 shown in another position.

After connecting elements 15 have been embedded in plaster compound, 11*a*, model 10 is turned from the position shown in FIG. 2 again by 180° in the plane of the drawing, so that model 10 assumes again the starting position as shown in FIG. 3. Cavities 12*a*, 12*b*, which would otherwise be difficult to fill, already contain plaster compound 11*a* as shown. Now, fresh plaster compound 11 can be filled in from the top through opening 13, and the entire remaining cavity of model 10 can be filled with fresh plaster compound. No air inclusions remain in this process in the cavities of model 10.

Figure 4:
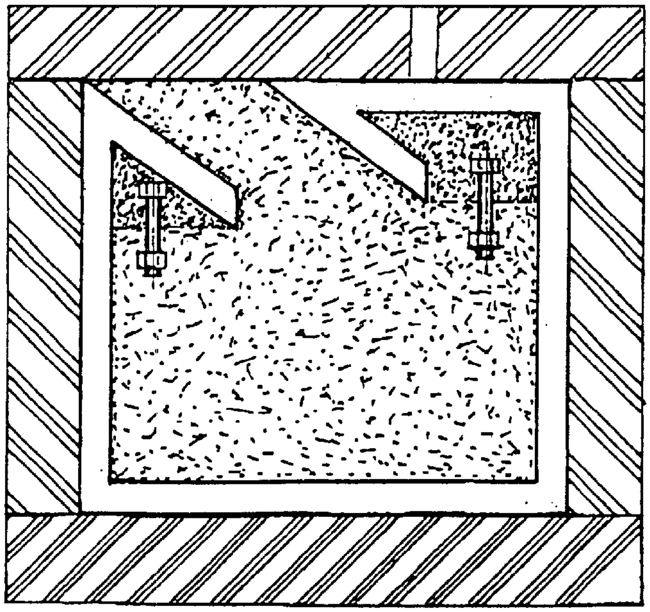
FIG. 4 is another schematically simplified view of the finished mold resulting from the model of FIG. 1.

Model 10, which is now completely filled in the interior cavity with plaster compound 11, 11*a*, 11*b*, is subsequently set up in a container containing additional fresh plaster compound, and is then completely coated with plaster compound 11*c* on the outside, as shown in FIG. 4. After this process, model 10 is completely reproduced by plaster compound 11, 11*a*, 11*b* both in its complex inner contour and its outer contour. Model 10, which consists of plastic such as sintered polystyrene, can be removed by burning it out or by other methods. One obtains in this way the plaster mold which represents the negative for the manufacture of the prototype to be produced. A metal such as aluminum is subsequently poured into the mold, and the structural element is reproduced, so that the shape of the structural element corresponds to model 10. The cured plaster compound 11, 11*a*, 11*b*, 11*c*, which is present on the outside around the structural element and, of course, in the cavities of the structural element, is removed mechanically.

Connecting element 15 is shown enlarged in FIG. 3. It is possible to use screws with nuts as connecting elements 15, or any other elements which preferably have undercut surfaces. As can be seen in the figure, the shaft 15*a* of connecting element 15 is partially embedded in plaster compound 11*a*, which has already set. However, a piece of shaft 15*a* projects into the first still-unfilled cavity, as does nut 16. The underside of head 15*b* has undercut surfaces 15*c*. As a result of the anchor-like shape of screw head 15*b* with the undercut surfaces 15*c* and due to the shape of nut 16, a good bond of the fresh plaster compound 11 to the set plaster compound 11*a* is obtained after the fresh plaster has been filled in. The shape of connecting elements 15 is selected rather randomly in the exemplified embodiment according to FIG. 3. These connecting elements may also have heads with the shape of a dovetail, or grooves, a serration, a toothing or the like.

Figure 5:
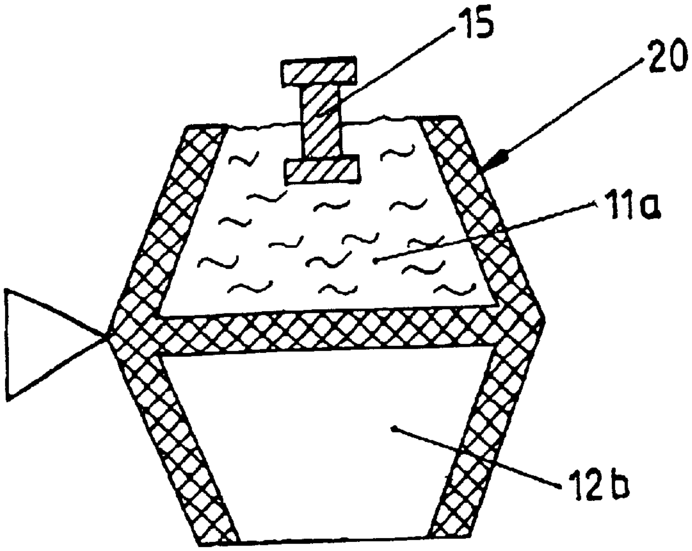
FIG. 5 is a schematically simplified sectional drawing of a model filled according to the process as defined by the invention, according to an alternative embodiment.
Figure 6:
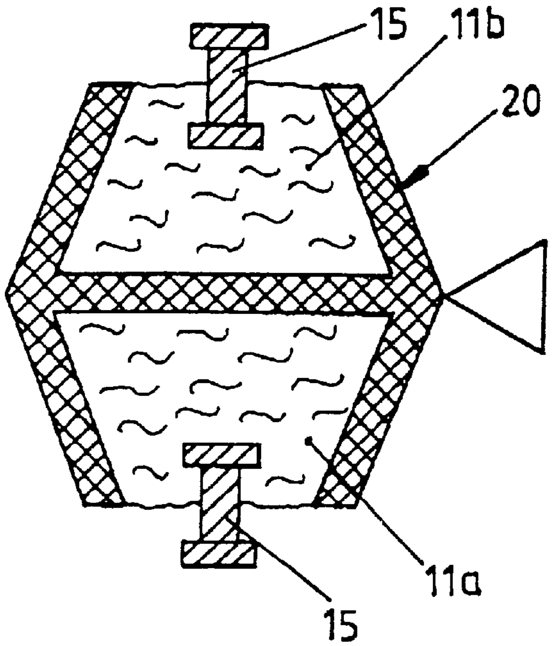
FIG. 6 is another view of the model shown in FIG. 5, rotated by 180°.
Figure 7:
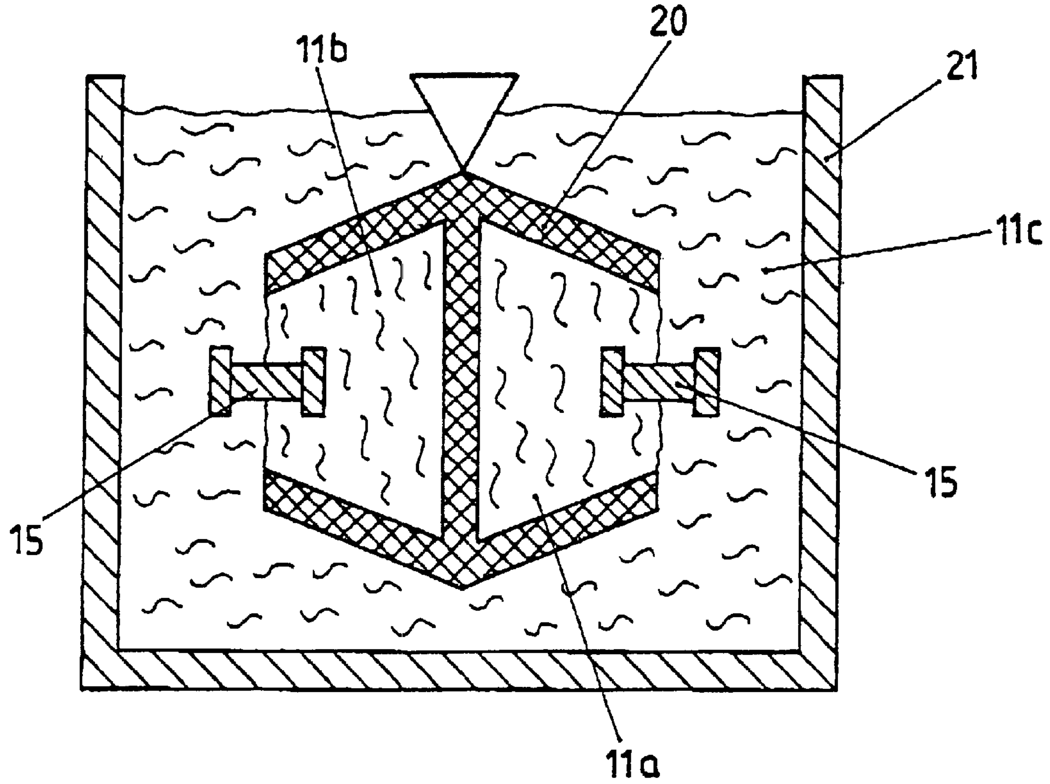
FIG. 7 is another view of the model according to FIGS. 5 and 6 shown in another phase of the process as defined by the invention.

Another embodiment of the invention is shown in FIGS. 5 to 7. FIG. 5 shows a schematic sectional representation of another model 20, which is filled in a number of steps according to the process as defined by the invention. Model 20 has a plurality of cavities, which are arranged so that the model cannot be completely filled in one process step. Therefore, the following procedure is employed: In its position shown in FIG. 5, model 20 is first filled with a plaster compound 11*a* in the cavity shown at the top. Again, a connecting element 15 can be incorporated in the plaster compound 11*a* in order to enhance bonding to additional plaster compound filled in a subsequent process step. As can be seen in FIG. 5, the lower cavity 12*b* initially remains unfilled. Model 20 is now turned in the plane of the drawing by 180°, so that it is moved into the position shown in FIG. 6. The cavity filled with plaster compound 11*a* is now disposed at the bottom. Cavity 12*b,* which is now disposed at the top, is then filled with a plaster compound 11*b* in a next step, so that the condition shown in FIG. 6 is reached. A connecting element 15 is again embedded in plaster compound 11*b* in order to facilitate bonding to an additional plaster compound.

Reference is now made in the following to FIG. 7. Based on the representation according to FIG. 6, model 20 is turned by 90° counterclockwise in the plane of the drawing and is then placed in container 21 containing additional plaster compound 11*c*. Following curing of plaster compound 11*c,* model 20 can be removed, for example by burning it out, so that a plaster mold is then obtained that has cavities corresponding with the shape of the earlier model 20. A metal is again poured into the plaster mold and a structural element is obtained with a shape conforming to the one of model 20. Again, plaster compound 11*a,* 11*b,* 11*c* can be removed mechanically.

Accordingly, while only a few embodiments of the present invention have been shown and described, it is obvious that many changes and modifications may be made thereunto without departing from the spirit and scope of the invention.

What is claimed is:

1. A process for producing structural elements, comprising:

producing a pattern of the structural element, said pattern having cavities;

feeding said pattern with a molding compound in a plurality of successive feeding steps, said feeding steps comprising:

(a) changing the orientation of the pattern to a position that is not the original one, (b) then pouring the molding compound into a part of the pattern, (c) then turning the pattern to another position;

(d) then pouring the molding compound in again;

(e) repeating steps c and d until the pattern is entirely filled;

removing the pattern; and manufacturing the structural element by casting.

2. The process according to claim 1, wherein in at least one feeding step, the molding compound is poured into cavities of the pattern from the top, and any lateral openings of the pattern are first closed to prevent the molding compound from exiting through said lateral openings.

3. The process according to claim 1, wherein in at least a second of said successive feeding steps, at least one opening is provided in the pattern in a suitable location for pouring in the molding compound.

4. The process according to claim 1, further comprising turning the pattern by a multiple of 90° about one of three spatial axes after each process step.

5. The process according to claim 1, wherein connecting elements are embedded cast in the molding compound during a feeding step, to enhance bonding of fresh molding compound to already cured molding compound in a subsequent process step.

6. The process according to claim 5, wherein the connecting elements have undercut surfaces to obtain a positive connection with the molding compound.

7. The process according to claim 1, wherein a reinforcement is incorporated in elongated cavities of the pattern, said cavities being filled with molding compound.

8. The process according to claim 7, wherein the reinforcements are selected from the group consisting of wires, flat steel, round steel, and metal parts.

9. The process according to claim 1, wherein the molding compound is a plaster compound.

10. The process according to claim 1, wherein the structural elements have complex cavities and consist of aluminum.

* * * * *